United States Patent [19]

Van Bussel

[11] 3,719,980

[45] March 13, 1973

[54] METHOD OF MAKING A PERIPHERALLY GROOVED SHEET METAL ARTICLE

[76] Inventor: Peter J. Van Bussel, 25501 Glendale Avenue, Detroit, Mich. 48239

[22] Filed: Aug. 31, 1971

[21] Appl. No.: 176,582

Related U.S. Application Data

[63] Continuation-in-part of Ser. No. 44,943, June 10, 1970, Pat. No. 3,633,431.

[52] U.S. Cl. ............................................. 29/159 R
[51] Int. Cl. .......... B21d 53/26, B21k 1/28, B21k 1/42
[58] Field of Search ....... 29/159 R, 159.01; 74/230.8; 72/348

[56] References Cited

UNITED STATES PATENTS

| | | | |
|---|---|---|---|
| 620,479 | 2/1899 | Mittinger | 29/159 R |
| 1,525,479 | 2/1925 | Weber | 29/159 R |
| 1,700,416 | 1/1929 | Nelson | 74/230.8 |
| 2,006,281 | 6/1935 | Schwarz | 29/159 R X |
| 2,656,730 | 10/1953 | O'Mitchell | 29/159 R X |
| 2,905,004 | 9/1959 | Rose | 74/230.8 |
| 3,286,539 | 11/1966 | Loper et al | 29/159 R X |

Primary Examiner—Charles W. Lanham
Assistant Examiner—V. A. DiPalma
Attorney—Charles R. Rutherford

[57] ABSTRACT

The invention relates to methods of making or manufacturing peripherally grooved sheet metal articles such as grooved wheels, V-type pulleys, automobile wheel rims, etc. Several embodiments of both the method of manufacture and pulley or wheel construction are disclosed. Basically, all of the embodiments have in common the use of the pair of sheet metal discs as the starting blanks for manufacturing a single peripherally grooved article. The discs are progressively formed into a final pulley in three stages. In the first stage, the metal discs are formed into nesting blanks forming an intermediate pre-clinched blank assembly shaped to facilitate the second step which involves acting upon the first assembly in a die to form an intermediate clinched blank assembly in which the discs are held together by an annular clinched portion. In the third step, the clinched blank assembly is acted upon to spread apart the outer rim sections to form a peripherally grooved sheet metal article. A multi-pulley or wheel construction is disclosed in which a plurality of the single pulleys or grooved sheet metal articles are clinched together to form a multi-pulley or wheel construction having several V-grooves. One preferred form of the clinched portion comprises mutually intertwining generally S-shaped, in cross-section, sections of each disc, end portions of the S-shaped sections being folded back upon the S-shape.

13 Claims, 30 Drawing Figures

PATENTED MAR 13 1973 3,719,980

INVENTOR
PETER J. VAN BUSSEL
BY
Whittemore, Hulbert
& Belknap
ATTORNEYS

INVENTOR
PETER J. VAN BUSSEL
BY
ATTORNEYS

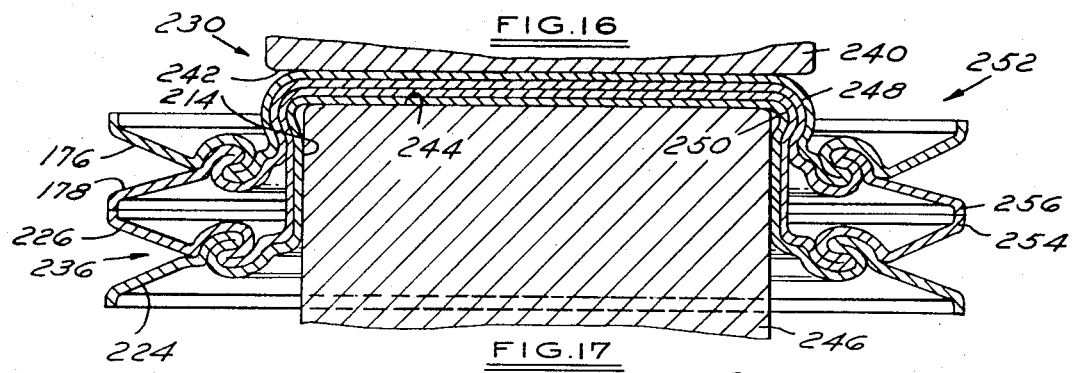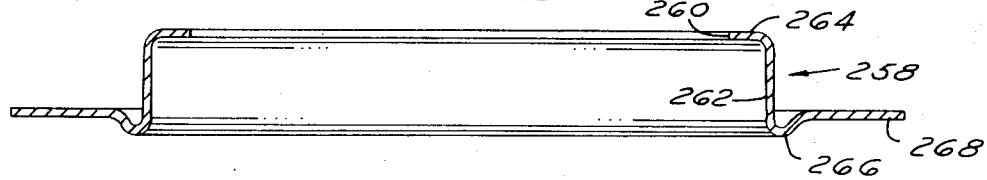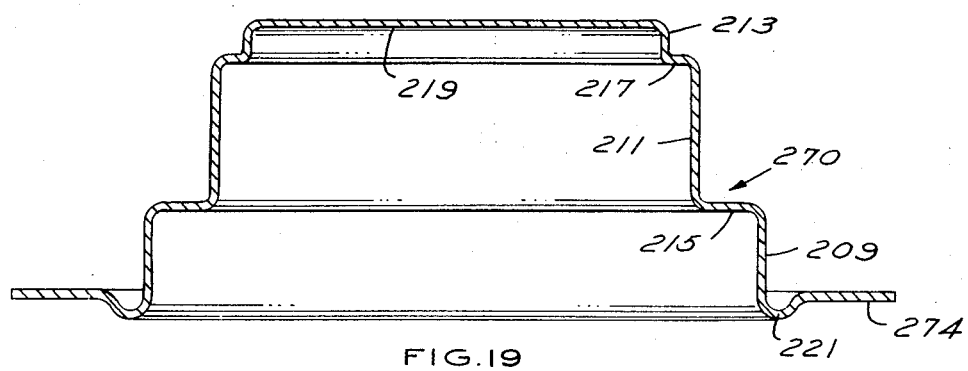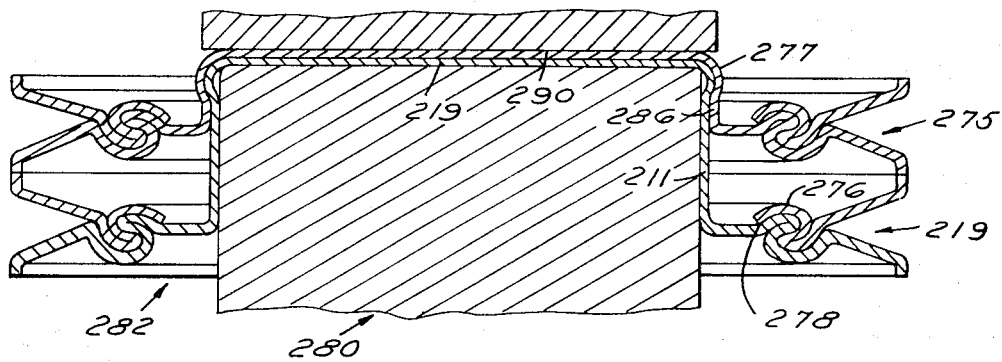

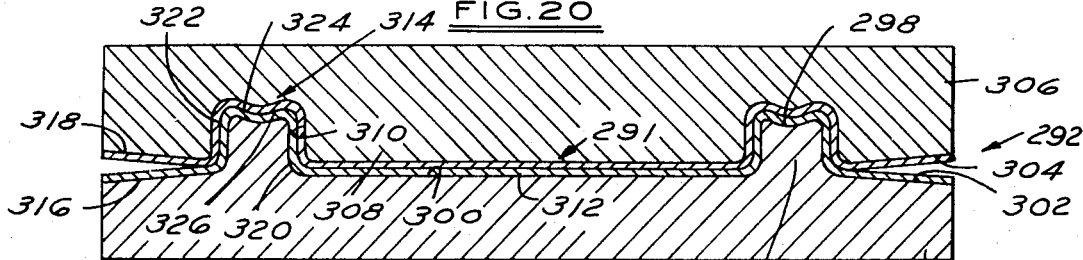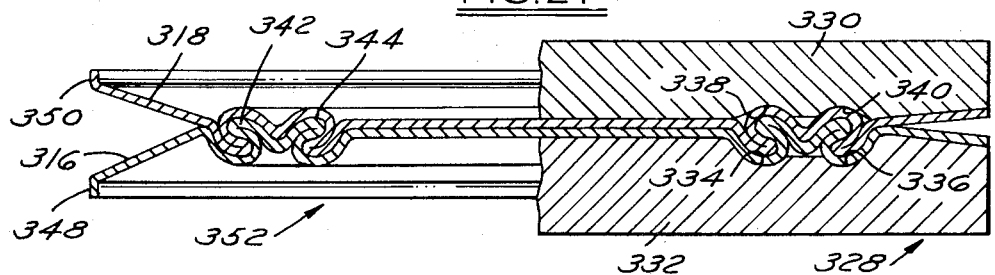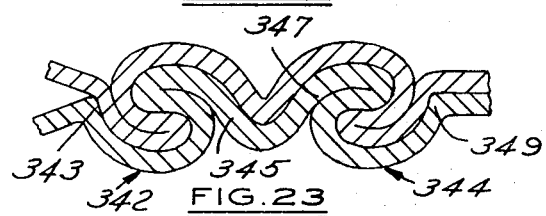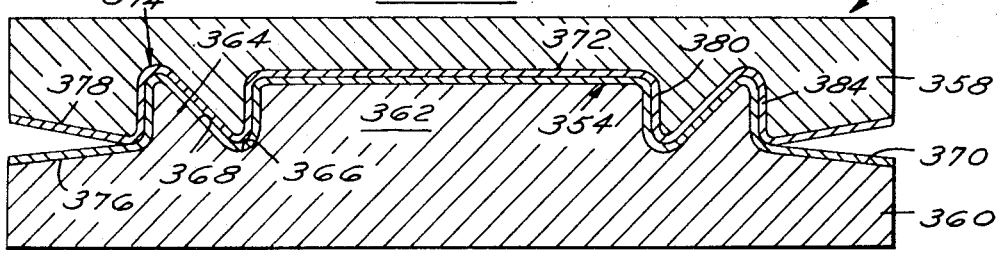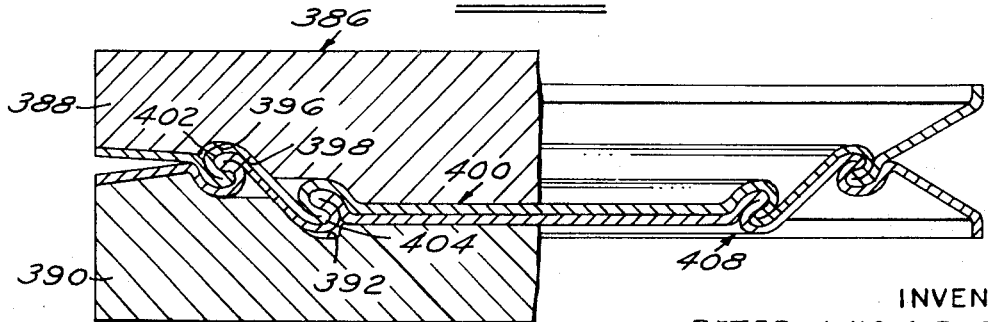

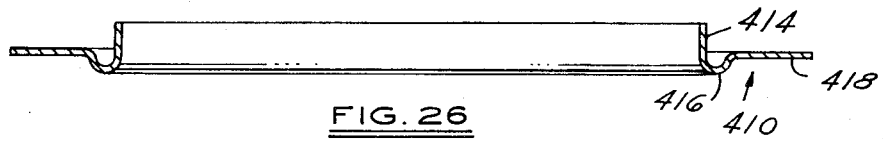
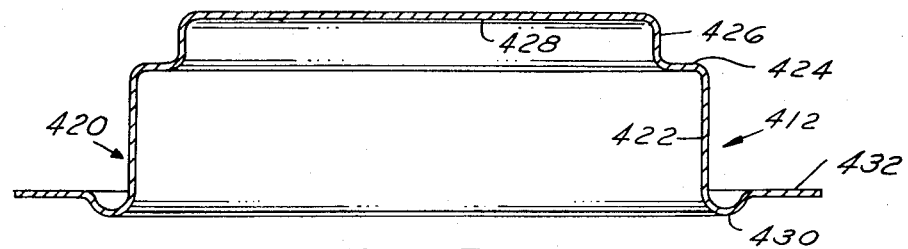
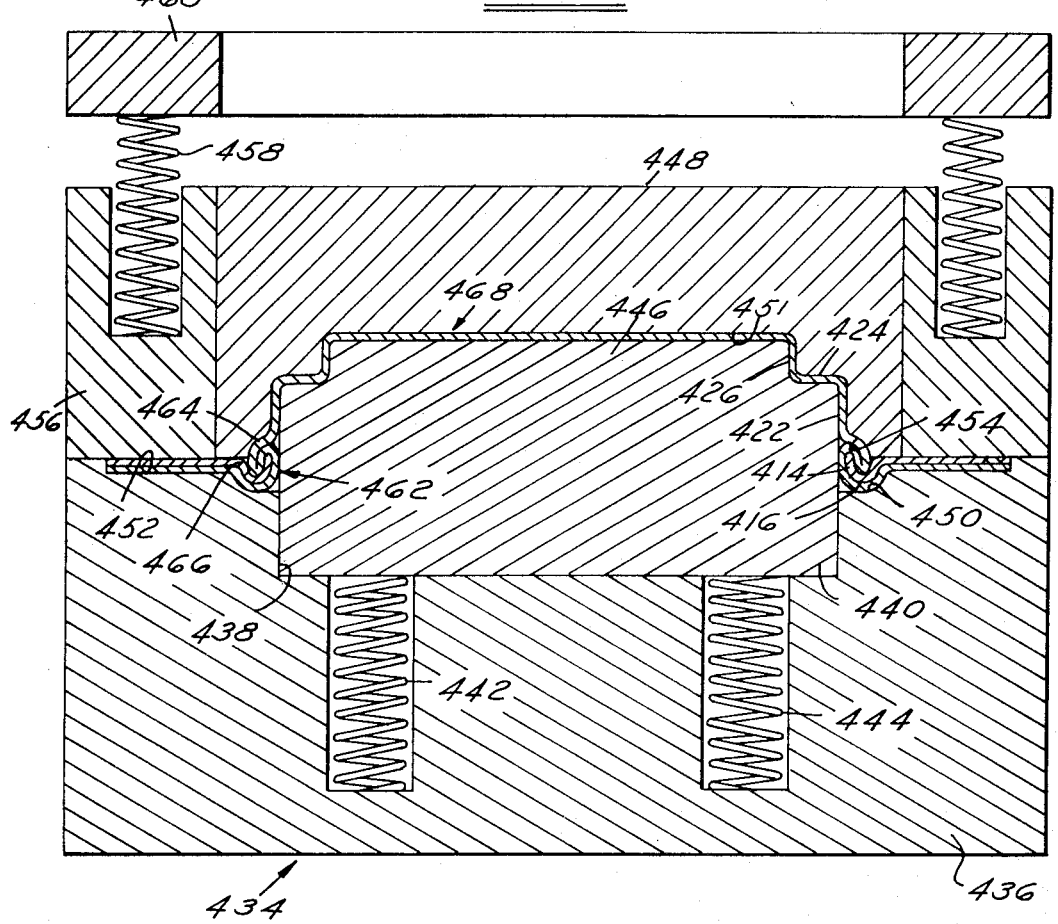

INVENTOR
PETER J. VAN BUSSEL
BY
Whittemore, Hulbert
& Belknap ATTORNEYS

METHOD OF MAKING A PERIPHERALLY GROOVED SHEET METAL ARTICLE

CROSS-REFERENCE TO OTHER APPLICATIONS

This application is a continuation-in-part of my copending application Ser. No. 044,943, filed June 10, 1970 and now U.S. pat. No. 3,633,431.

BACKGROUND OF THE INVENTION

In the past, pulley sheaves or wheels having generally V-shaped peripheral grooves have been made from sheet metal by many different methods including spinning on a lathe to deform the peripheral rims, stamping two separate parts and then securing the parts together by spot welding or the like, and utilization of an internal expander within a cup-shaped blank for bulging and forcing the walls of the blank outwardly, the bulge ultimately being crimped together to form one of the peripheral rims of the V-shaped pulley grooves.

These methods for manufacturing pulleys have certain drawbacks. Spreading of sheet metal on a lathe to form a pulley is tedious, time-consuming and costly. Stamping of two separate parts followed by welding or riveting is also time-consuming and costly. Utilization of an internal expander within a blank for bulging the walls of the blank outwardly is an undesirable process for making pulleys because the internal expander from time to time has to be replaced. This replacement requires shutting down of the stamping operation and a temporary loss of production in addition to the added expense of replacing the internal expander.

In my present invention, I have provided a method for making a pulley or a grooved wheel or article in two pieces from sheet metal by stamping operations along by use of a progressive die process. Thereby I avoid the disadvantages of the prior methods.

One object of my invention is, therefore, to provide a method of making pulleys or grooved wheels from sheet metal by stamping alone by utilizing a progressive die process.

Another object of my invention resides in the method of making a V-grooved pulley or grooved wheel from cold deformable metal in which all of the operations are accomplished by external compression forces applied to the pulley blank in an axial direction.

A still further object of my invention resides in the method of making dual-grooved pulleys or grooved wheels from sheet metal by stamping operations alone utilizing a progressive die process.

Another object of my invention is to provide a method for making high quality, very accurate and constant radius pulleys or grooved wheels by ordinary blanking and forming dies and rolls.

SUMMARY OF THE INVENTION

The pulley or grooved wheel or article comprises a pair of metal discs each including a peripheral rim portion. The rim portions diverge from each other. A central hub portion is formed of the material of at least one of the discs. An annular clinched portion is provided between the rim portions and hub portion. The clinched portion is formed of material of both discs folded over upon each other. Preferably, the clinched portion comprises mutually intertwining generally S-shaped, in cross-section, sections of each disc. The end portions of the S-shaped sections are folded back upon the S-shape. In one embodiment, the central hub portion is formed of material of only one of the discs while the other disc is a ring-like member. In another embodiment, the central hub portion is formed of the material of both of the discs. Several of the pulleys may be joined together to form a multi-pulley having more than one peripheral groove.

The method of manufacturing the pulley or grooved wheel comprises the steps of first die-forming and nesting together a pair of metallic discs to form an intermediate pre-clinched blank where at least one of the discs has a central portion and both of which have nesting peripheral grooves surrounding the central portion with the remaining peripheral portions thereof defining an annular rim. This intermediate pre-clinched blank assembly is then subjected to the action of a die to cause deformation of the material of the nesting peripheral grooves and adjacent material of the blank to form an annular clinched portion securing the metallic discs together to form an intermediate clinched blank assembly. The annular rim portions are then spread apart to define an annular groove to receive a pulley belt. A technique for clinching several of the single pulleys together to form a multi-pulley is provided.

In the drawings:

FIG. 16 illustrates the multiple pulley formed from the clinched members of FIGS. 14 and 15;

FIG. 17 is a sectional view of the pre-clinched outer blank forming an intermediate stage in the development of a pulley section defining a portion of another embodiment of a multiple pulley;

FIG. 18 is a sectional view of the inner pre-clinched blank member received in the outer member of FIG. 17;

FIG. 19 is a sectional view of a die illustrating the method of clinching a pair of pulley sections formed from and in accordance with the method illustrated in connection with the FIG. 17 and 18 embodiments;

FIG. 20 is a sectional view of a die illustrating fabrication of an intermediate pre-clinched blank in accordance with another embodiment of the invention;

FIG. 21 is a sectional view illustrating on the right hand side clinching of the blank of FIG. 20 and on the left hand side the final pulley fabricated from the clinched blank;

FIG. 22 is an enlarged view of the clinched portion of the pulley of FIG. 21;

FIG. 23 is a sectional view of a die illustrating forming an intermediate pre-clinched pulley blank in accordance with a further embodiment of the invention;

FIG. 24 is a sectional view illustrating on the left hand side clinching the blank of FIG. 23 and on the right hand side the finished pulley fabricated therefrom;

FIG. 25 is a section view illustrating an intermediate pre-clinched blank defining an outer pulley member;

FIG. 26 is a sectional view of an intermediate preclinched blank forming the inner pulley member received in the blank of FIG. 25;

FIG. 27 is a sectional view of a die illustrating clinching together of the blanks of FIGS. 25 and 26;

Figure 1:
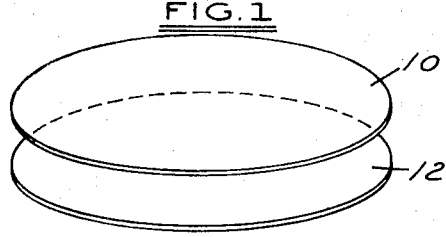
FIG. 1 is a view in perspective illustrating a pair of blanks which are utilized to fabricate a pulley in accordance with the method of the present invention.

Referring to the embodiment illustrated in FIGS. 1–7, it will be noted that the process for making a pulley begins with a pair of flat circular metal discs 10, 12. The discs 10, 12 may be fabricated from any desired deformable metal such as steel.

The discs 10, 12 are first operated upon in a die set 14. The die set 14 is mounted in the usual press wherein commonly the lower die half 16 is fixedly mounted on a stationary support while the upper die half 18 is mounted on a movable support which is powered up and down by a ram and flywheel arrangement.

The die halves have a mating configuration which defines the shape of the intermediate pre-clinched pulley blank which is formed therein. As will be noted, the lower die half 16 comprises an upwardly projecting central cylindrical portion 20 which is surrounded at its base by a peripheral groove 22 with the remaining outer peripheral portion 24 being substantially flat. The upper die half 18 has a cavity facing the die half 16 which comprises a central cylindrical recess 26 surrounded by an outwardly projecting flange 28 with the remaining peripheral face portion 30 being substantially flat to thereby match and register with the opposing face of the lower die half 16.

Figure 3:
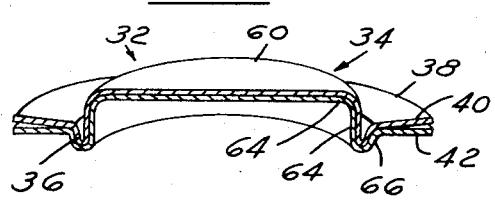
FIG. 3 is a view in perspective of the pulley in the intermediate stage as fabricated in the die of FIG. 2.

The intermediate pre-clinched pulley blank 31 which is formed in the die set 14 is illustrated in FIG. 3. The blank 32 is essentially hat-shaped and comprises a central hollow cylindrical hub portion 34 surrounded by a peripheral groove 36 with the remaining peripheral rim portion 38 being substantially flat, both discs being nested together. It will be noted that the outermost segments of the portion 38 are spread apart a slight distance. This results from pressure relief in the die set in the outermost segments of the die face portions 24, 30. The slight spreading of this portion of the pulley blank is advantageous in permitting easy insertion of a roller in the final step of fabricating the pulley to separate the wall portions 40, 42 and form a peripheral V-shaped groove to receive a V-belt.

The pre-clinched intermediate blank 32 is then placed in a second die set 44. The die set 44 has an upper and a lower half 46, 48, the upper half 46 being raised upon insertion of the blank 32 and then lowered to accomplish the clinching operation. As will be noted, the lower half 48 has a central cylindrical recess which receives a movable cylindrical member 50. The member 50 is urged upwardly by means of springs 52, 54. With the upper half 46 raised, the member 50 is projected above the face of the lower half 48. The member 50 is received in the central hollow cylindrical portion 34 of the blank 32 and functions to position the blank 32 for the clinching operation. An L-shaped annular recess 56 surrounds the member 50. The peripheral groove portion 36 of the blank 32 is received in the recess 56. The upper die half 46 has a circular flat face 58 which registers with the member 50 and the central portion 60 of the blank 32. An annular recess 62, which is C-shaped in cross-section, surrounds the portion 60. It will be noted that the upper surface of the recess 62 is inclined radially outwardly. This is of importance in the clinching step. The remaining marginal face portions of the die faces are substantially flat.

When the blank 32 is positioned on the lower die half 48, the upper die half 46 is moved downwardly whereupon the die face portion 58 contacts the outer surface of the blank wall portion 60 thereby tending to compress the blank 32. Continued downward movement of the die shoe 46 causes the wall portions 64, 65, 66 of the blank 32 to fold upon themselves radially outwardly but with the material of the groove remaining relatively stationary in a generally S-shape to clinch the members 10, 12 together. The shape of the recesses 56, 62 controls the shape of the clinched portions along with the original shape of the wall portions 64, 65, 66. The exact shape of the clinch is important in the invention because it results in a high strength clinch which will not separate under the high pressures to which the pulley is subjected during use. As will be noted, in addition to the central mutually intertwining S portion of the clinch, the end segments or tails of the S are bent back upon the S-shape in a fashion to further clinch the assembly together. The segment 68 is bent downwardly while the segment 70 is bent upwardly. This clinch results in a connection which is interlocked eight different ways so that each curve supports other curves in a cooperative manner. It will be noted that a minimum of material is used to achieve this end, the only double wall thickness of each blank section being used at 71, 73 wherein the legs of one-half of each S are pressed together and received between spaced apart legs forming one-half of the opposite S.

Figure 5:
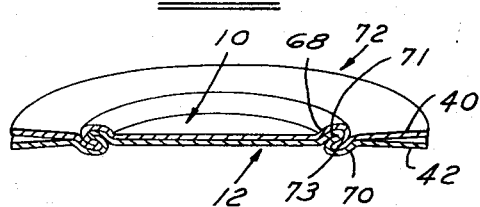
FIG. 5 is a view in perspective of the pulley in an intermediate stage after removal from the die of FIG. 4.
Figure 6:
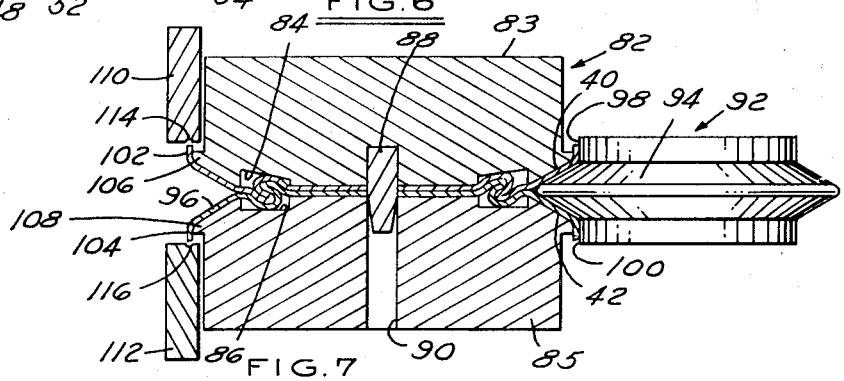
FIG. 6 is a view of the tooling utilized in the final stage of fabricating the pulley.
Figure 7:
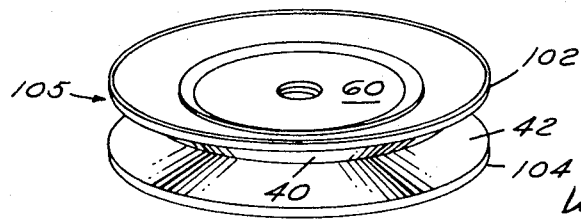
FIG. 7 is a view in perspective of the final pulley.

As may be noted in the intermediate clinched blank 72 illustrated in FIG. 5, if either of the outer wall portions 40, 42 are urged towards separation in either direction, the clinch will tend to maintain the members 10, 12 together at basically two different points. For example, assuming a tendency to move the wall portion 42 downwardly as viewed in FIG. 5, the clinch segment 70 will tend to compress and drive radially inwardly the folded over wall segments 73. In turn, the wall segments 73 will tend to compress and clinch more tightly the folded over wall segments 71, thus causing the clinch to wedge even tighter. It will be appreciated that if the ends of the central S clinched portion were not bent back as at 68, 70, this double clinching action would not occur.

In the final stage of manufacture of the pulley, the blank 72 is positioned in a third die set 82. The die set 82 has upper and lower die halves 83, 85, which have registering annular grooves 84, 86 which receive the clinched portion of the blank 72, the lower groove 86 initially acting to position the blank in the desired position. After the blank 72 has been laid on the lower half 85, the upper half 83 is caused to be lowered thus firmly grasping the blank 72. Representatively, the upper half 83 includes a punch 88 which registers with an opening 90 through the lower half to thereby cause a hole to be punched in the center of the blank 72 for ultimate rotatable mounting of the pulley.

After the blank has been mounted in the die set 82, two additional operations are performed. Firstly, a roller 92 is forced into the space between the rim portions 40, 42. The roller 92 has a V-shaped central peripheral portion 94. The die set 82 is caused to spin around while the roller is advanced thus forcing the rim portions 40, 42 apart in the desired V-shape. The die set has a peripheral V-shaped recess 96 which permits spreading of the rims 40, 42 and acts as a stop when the rims have been spread sufficiently. The size of the resultant V-groove may be varied by varying the size of the roller and die.

The roller 92 has cylindrical portions 98, 100 adjacent the central portion 94. The cylindrical portions 98, 100 contact the outer marginal edges of the rim portions 40, 42 and cause these sections to be bent outwardly to define flanges 102, 104. Each die half is provided with a peripheral flange 106, 108 against which the flanges 102, 104 are bent. The flanges 106, 108 are of less thickness than the length of the flanges 102, 104 with the result that a tip portion extends beyond the flanges 106, 108. A pair of shaving tools 110, 112 having cutting edges 114, 116 are then moved into contact with the tips of the flanges 102, 104. The tools 110, 112 shave off the excess metal on the tips of the flanges 102, 104 and result in the final pulley 105 illustrated in FIG. 7, which has the desired finished dimensions which result in proper balance thereof. If desired, the pulley may be additionally strengthened by spot welding.

FIGS. 8-11 illustrate another embodiment of the invention which in many respects is similar to that of the embodiment of FIGS. 1-7. The basic difference in this embodiment is that one of the original discs is formed as a ring with a circular center portion thereof cut out. This results in a saving of metal in the final pulley. Additionally, the circular portion removed from the center of the disc may, in the same operation as it is removed from the solid blank, be formed into an intermediate pre-clinched pulley blank for the manufacture of another, smaller pulley.

Figure 2:
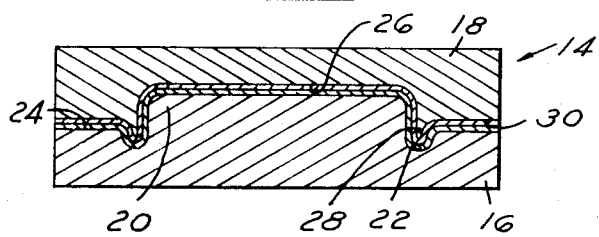
FIG. 2 is a view of a die illustrating the first step in forming a pulley.
Figure 8:
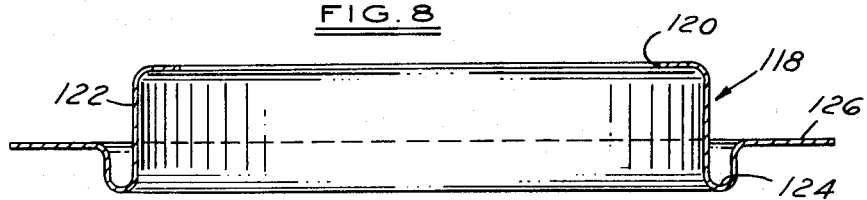
FIG. 8 is a sectional view of a blank which has been formed in one step to an intermediate pre-clinch configuration as an outer pulley member in another embodiment of the invention.

Referring first to FIG. 8, an intermediate pre-clinched outer pulley member 118 is first formed in a die set such as the die set 14 illustrated in FIG. 2. The outer pulley member 118 is formed from a flat ring-like disc which has the center circular portion removed to define a central circular opening 120. The outer pulley member 118 is essentially hat-shaped and comprises a central hollow cylindrical hub portion 122 surrounded by a peripheral groove 124 with the remaining peripheral rim portion 126 being substantially flat.

A similar intermediate pre-clinched inner pulley member 128 is also formed in a hat-shaped configuration and in a die set as described. The member 128 is solid, that is, it does not have a central circular portion removed. The member 128 comprises cylindrical hub portion 130, peripheral groove 132 and flat peripheral rim portion 134 which match the configuration of the similar portions of the outer pulley member 118, the cylindrical hub portion 30 being of slightly smaller size to be received in the cylindrical portion 122 of member 118.

Figure 4:
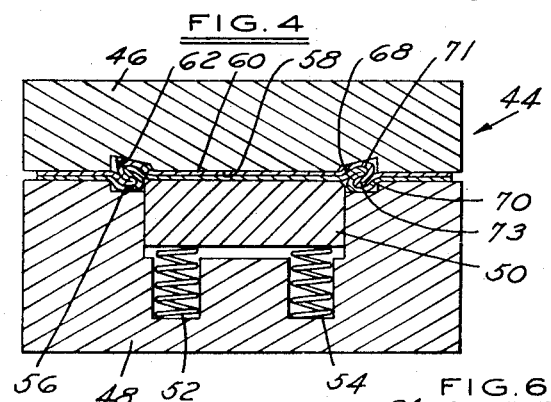
FIG. 4 is a view of a die illustrating the clinching operation in the next step of the method of fabricating a pulley.

The member 118 is nested on the member 128 and placed in a die set similar to the die set 144 shown in FIG. 4. Closing of the die results in a clinching operation as described in connection with FIG. 4 to produce an intermediate clinched blank 138 having an annular clinched portion 136 which is identical to that described in connection with the clinched blank 72 of FIG. 5. As will be noted in FIG. 10, the only difference between the clinched blank 138 and the clinched blank 72 is that the central hub portion 140 has a single wall thickness as a result of removal of the central portion of the disc forming the outer pulley member resulting in the opening 120.

The clinched blank 138 is then acted upon in a die set such as the die set 82 to cause spreading of the rim walls 126, 134, punching of a hole 150, and formation of outer flanges 152, 154 to result in the final pulley 156.

The embodiment illustrated in FIGS. 12-16 employs substantially the same principles with reference to forming a single pulley as are illustrated in FIGS. 1-7. This embodiment additionally provides a method for forming a multiple pulley, that is, a structure which is capable of manipulating more than one pulley belt.

Figure 12:
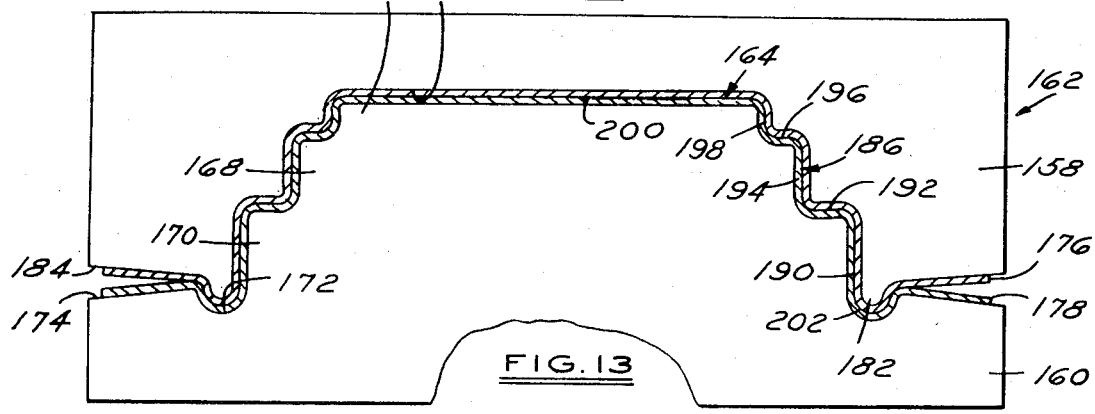
FIG. 12 is a sectional view of a die in which the outer pre-clinched member of a multiple pulley is formed in accordance with another embodiment of the invention.

Referring first to FIG. 12, a pair of circular metallic discs of the type previously described are inserted between upper and lower die halves 158, 160 of a die set 162. The die halves have a mating configuration which defines the shape of the intermediate pre-clinched outer pulley blank which is formed therein. As will be noted, the lower die half 160 comprises an upwardly projecting central cylindrical portion 164 which has stepped sections 166, 168, 170 each of reduced diameter with respect to the lower section. The portion 164 is surrounded at its base by a peripheral groove 172 with the remaining outer peripheral portion 174 being angled downwardly to provide the relief for initial separation of rim portions 176, 178 as previously described. The upper die half 158 has a cavity 180 facing and in registry with the lower die half portion 164. The cavity 180 has an interior configuration which matches the exterior configuration of the portion 164. The cavity 180 is surrounded by an outwardly projecting peripheral flange 182 with the remaining peripheral face portion 184 angling upwardly to provide the aforementioned relief.

The intermediate pre-clinched outer pulley member blank 186 which is formed in the die set 162 comprises a central hollow cylindrical hub portion having a first cylindrical wall portion 190, a first radially inwardly directed wall portion 192, a second cylindrical wall portion 194 of smaller diameter than the portion 190, a second radially inwardly directed wall portion 196, a third cylindrical wall portion 198 of less diameter than the portion 194 and a flat interconnecting circular portion 200. A peripheral grooved portion 202 surrounds the base of the cylindrical wall portion 190 with the remaining peripheral rim portions 176, 178 being substantially flat and diverging from each other.

Figure 13:
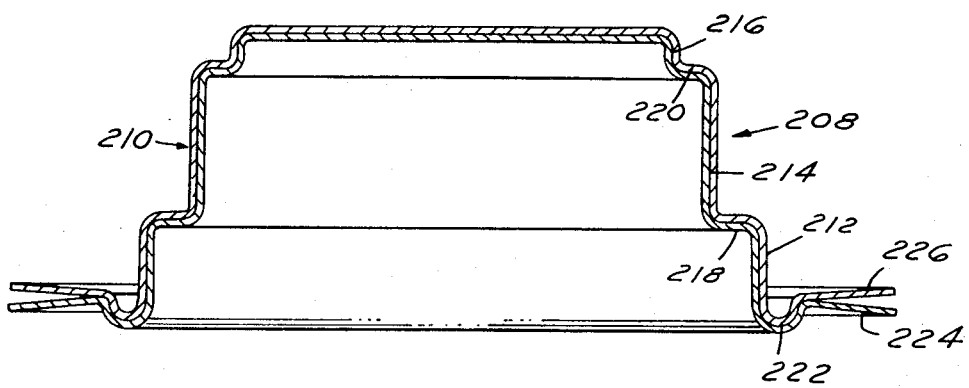
FIG. 13 illustrates the inner pre-clinched member which ultimately is mated with the outer member of FIG. 12.

As shown in FIG. 13, an inner pre-clinched intermediate pulley blank 208 is formed in a die set similar to the die set 162 to mate with the blank 186 and form a pulley having a pair of V grooves to receive two V-belts. The blank 208 includes a central hollow cylindrical hub portion 210 which also has three cylindrical wall portions 212, 214, 216 of successively decreasing diameter interconnected by radially inwardly directed wall portions 218, 220. A peripheral groove 222 and outwardly extending peripheral walls 224, 226 complete the blank. The cylindrical wall portion 212, radial wall portion 218, groove 222 and rims 224, 226 have dimensions identical to the corresponding portions of the blank 186. These portions of the blanks are clinched. However, the cylindrical wall portions 214 is of greater length than the corresponding portion of the blank 184 by a distance equal to the ultimate divergence of the pulley rims to space the two pulley members apart when they are connected together. The remaining portions of the blank 208 are of smaller diameter than the blank 186 by the amount of the wall thickness so that the blank 208 may ultimately be inserted into the blank 186.

Figure 14:
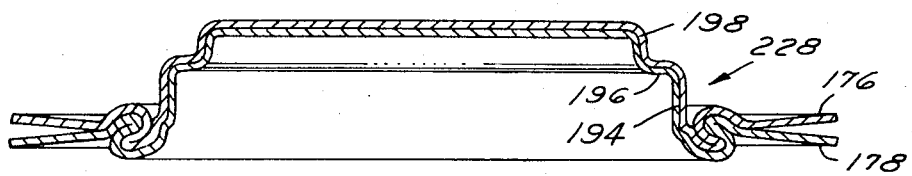
FIG. 14 illustrates the outer member of FIG. 12 after it has been clinched.

Subsequent to formation of the blanks 186, 208, these blanks are clinched together in a manner described in connection with the FIGS. 1-7 embodiment. The intermediate clinch blank 228 formed from the blank 186, illustrated in FIG. 14, is formed in a die set similar to the die set 44 illustrated in FIG. 4. The only difference is that the movable member 50 has added thereto an upwardly projecting portion conforming to the interior shape of the upper cylindrical portions 194, 198 and radial wall 196 to prevent deformation of these wall portions during the clinching action. The clinched blank 228 is then placed in a die set similar to the die set 82 and the walls 196, 178 are spread apart and flanges 232, 234 are formed and shaved as described in connection with FIG. 6 to result in the final outer pulley member 230 illustrated in FIG. 15. The inner blank 208 is similarly clinched with the walls 224, 226 being subsequently spread apart and flanged to result in the final inner pulley member 236 illustrated in FIG. 16.

The pulley members 230, 236 are placed in a die set 238 as shown in FIG. 16. The die set 238 has an upward movable die half 240 having a lower flat face 242 which registers with a similar but smaller diameter flat face 244 of lower die half 246. The diameter of the lower die half 246 is substantially equal to but slightly less than the interior diameter of the wall portion 214 of the inner pulley member 236 so as to be slidably receivable therein. The inner and outer pulley members 230, 236 are nested together and then received upon the lower die half 246. The nested pulley members may be slid onto the die half until the upper face of the die half contacts the radial wall 220. The upper die half 240 is then lowered forcing the nested pulley members further onto the lower die half 246 with the result that the radial walls 196, 220 and cylindrical walls 198, 216 are deformed outwardly. These walls will pop outwardly at a given point and form outwardly directed nesting annular bulges 248, 250 which suffice to clinch the pulley members together and form the final multi-pulley 252 illustrated in FIG. 16. It will be noted that the flanges 254, 256 of the adjacent pulley members abut against each other to result in a substantially closed final multi-pulley in which the adjacent walls of the pulley members serve to support each other and add overall strength to the pulley construction.

Figure 9:
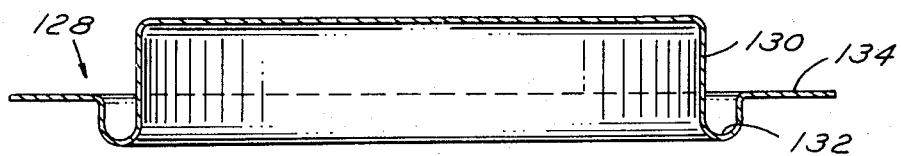
FIG. 9 is a sectional view of a blank formed in an intermediate pre-clinch configuration defining an inner member for reception in the blank of FIG. 8.
Figure 10:
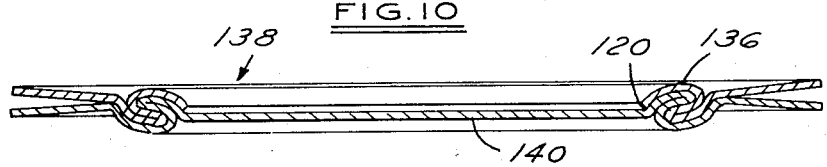
FIG. 10 is a sectional view of the blanks of FIGS. 8 and 9 after they have been clinched together.
Figure 11:
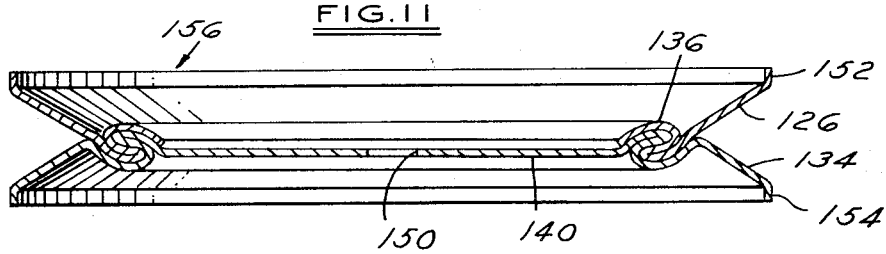
FIG. 11 is a sectional view of the finished pulley formed of the clinched blanks of FIG. 10.

FIGS. 17-19 illustrate a method for making a multi-pulley substantially in the manner described in connection with FIGS. 12-16 but employing the principle of the ring-like blank of the embodiment illustrated in FIGS. 9-11. As will be noted in FIG. 17, an outer intermediate pre-clinched pulley blank 258 is formed from an annular flat disc in which a central circular portion has been removed to define a central opening 260. The intermediate pre-clinched blank 258 forms part of an inner pulley member. The blank 258 comprises a hollow central cylindrical portion 262 having an annular radially inwardly directed flange 264. A peripheral groove 266 is provided at the base of the cylindrical portion with the remaining peripheral rim portion 268 being substantially flat.

The mating intermediate pre-clinched inner pulley blank 270 illustrated in FIG. 18 assumes substantially the shape of the inner intermediate pre-clinched pulley blank 208 illustrated in FIG. 13 and has cylindrical walls 209, 211, 213, radial walls 215, 217, circular wall 219, groove 221 and rim 274. The blank 258 is nested upon the blank 270 and then clinched in the manner described in connection with the FIG. 14 embodiment with the rim walls 268, 274 subsequently being spread and flanges formed thereon and shaved as illustrated in FIG. 15 to form the pulley 219.

Figure 15:
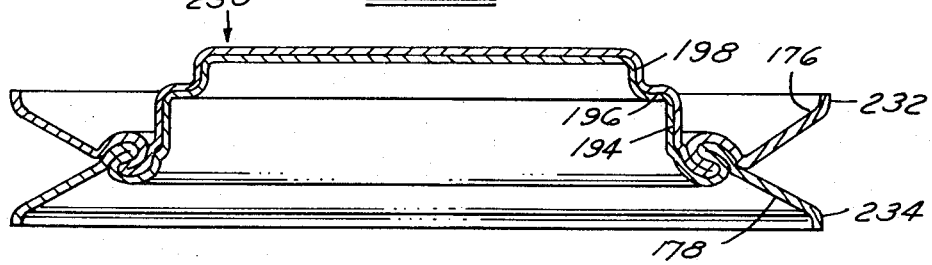
FIG. 15 illustrates the inner member of FIG. 13 after it has been clinched.
Figure 28:
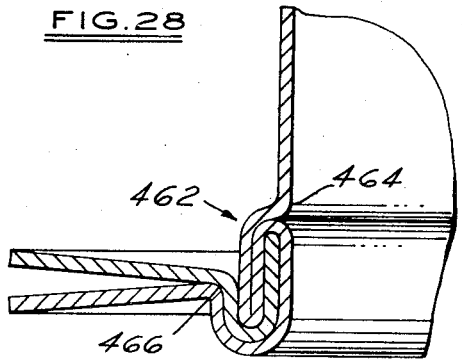
FIG. 28 is an enlarged view of the clinched portion of the pulley blank of FIG. 27.

As will be noted in FIG. 19, an outer pulley blank 275 is formed in the same manner as the pulley blank 219 having the shape of the pulley 230 illustrated in FIG. 15, it being noted that the center portion of the pulley element 276 is also removed to define an opening 278. The pulleys 219, 275 are placed in a die set 280 basically identical to the die set 238 illustrated in FIG. 16 and clinched together to form an annular clinch bulge 277 in the manner of the FIG. 16 method to result in a final multi-pulley 282. It will be noted that in this multi-pulley only a single thickness cylindrical walls 211, 286 and central walls 219, 290 join the clinched portions of the pulley members together. This results in a considerable savings in material but with a final multinpulley which has the desired high strength characteristics for most applications.

FIGS. 20-22 illustrate a method for fabricating a pulley in which a double clinch is utilized for extra strength. As will be noted in FIG. 20, an intermediate pre-clinched pulley blank 291 is formed of a pair of circular metallic discs in a die set 292. The lower die half 294 has an annular projection 296 on the working face thereof. The outer face 298 of the projection is dished in from each side edge of the projection towards the center thereof. The face portion 300 surrounded by the projection is substantially flat. The remaining marginal face 302 is substantially flat and diverges from the opposing face portion 304 of the upper half 306 to provide the desired relief as hereinbefore provided.

The upper die half has a central cylindrical projection 308 which is received in the recess defined by the projection 296. An annular cavity 310 having a mating configuration to the projection 296 surrounds the projection 308.

The resultant intermediate pre-clinched blank 291 has a configuration comprising a relatively flat central circular hub portion 312 surrounded by an annular double groove 314 and terminating in diverging rim walls 316, 318. The portion 314 includes inner and outer concentric cylindrical wall sections 320, 322 interconnected by a dished portion comprising downwardly inclined segments 324, 326. The wall sections 320, 326 form one half of the double groove while the wall sections 322, 324 form the other half.

The blank 291 is then placed in a die set 328 comprising upper and lower die halves 330, 332 as illustrated in the right hand portion of FIG. 21. The lower die half 332 has a pair of spaced apart annular grooves 334, 336 which are in general alignment with the cylindrical walls 320, 322 of the blank 291 when the blank 291 is set thereon. Similar grooves 338, 340 are provided in the opposed face of the upper die half 330 in registry therewith. After the blank 291 has been laid on the lower die half, the die is closed causing deformation of the portion 314 and adjacent portions of the central portion 312 and rim walls 316, 318 to define a pair of oppositely disposed annular clinched portions 342, 344 which, as will be noted in FIG. 22, have substantially the configuration of the clinch described in FIG. 5. As illustrated on the left hand portion of FIG. 21, the clinched intermediate blank is subsequently acted upon as previously described to spread the rim walls 316, 318 apart and form the flanges 348, 350 to produce the final pulley 352.

FIG. 22 illustrates the final clinch structure. The grooves 334, 336, 338, 340 of the die set 328 are oppositely angled to force the lower portions of walls 320, 322 towards each other and the upper portions away from each other to result in the pair of annular concentric clinches 342, 344 which are mutually intertwining generally S-shaped in cross-section, and with end portions 343, 345, 347, 349 folded back upon the S-shape. As will be noted, the S-shape of the outer of the clinched portions faces radially inwardly and the S-shape of the inner of the clinched portions faces radially outwardly with the clinched portions lying generally on a plane at right angles to the axial center of the pulley.

FIGS. 23 and 24 illustrate another embodiment of a method for fabricating a pulley having a double clinch. The embodiment is similar to that shown in FIGS. 20-22 excepting that the clinches are formed along an angle to the central plane of the pulley rather than along the central plane itself as in the previous embodiment. This construction facilitates fabrication of the pulley.

As will be noted in FIG. 23, the intermediate pre-clinched die blank 354 is formed in a die set 356 comprising upper and lower die halves 358, 360. The lower die half includes a central cylindrical projection 362 surrounded by an annular projection 364 which, along with the projection 362, defines an annular groove 366. It will be noted that the inner face 368 of the projection 364 is at an angle downwardly and inwardly with respect to the center of the die half. The remaining peripheral portion 370 is generally flat and diverges from the upper half to provide the desired relief. The working face of the upper die half 358 is configured to match the lower die half.

The resultant intermediate pre-clinched blank 354 comprises a central hollow cylindrical hub portion 372 surrounded by an annular projection 374 which is spaced therefrom. Diverging rim walls 376, 378 complete the blank. It will be noted that the outer cylindrical side wall 380 and the walls 382, 384 of the projection 374 define a sidewardly extending double groove S-shaped configuration which forms the material for the ultimate double-clinch.

The intermediate pre-clinched blank 354 is placed in a die set 386 having upper and lower halves 388, 390. The lower half has an annular groove 392 with one surface 394 slanting radially outwardly. The upper die half 388 has a similar annular groove 396 which is spaced radially outwardly from the groove 392 and has a slanting surface 398 in alignment with the surface 394 to thereby form with the groove 392 a generally S-shaped cavity. The blank 354 is acted upon in the die 386 to develop a clinched blank 400 having spaced apart annular concentric clinched portions 402, 404 interconnected by slanting wall 406 which spaces the clinched portions above and below the central plane at right angles to the axis of the blank with the S of the clinches facing radially inwardly. The clinched portions 402, 404 have the configuration previously described in connection with the FIG. 5 intermediate clinched pulley blank. As will be noted at the right hand side of FIG. 24, the clinched blank is acted upon to form the final pulley 408 as previously described.

FIGS. 25-30 illustrate an embodiment wherein the configuration of the clinch is modified. The clinch, however, as modified retains the basic simplicity and strength characteristics of the clinch described in connection with FIG. 5.

FIGS. 25 and 26 illustrate intermediate pre-clinched outer and inner blanks 410, 412 utilized to fabricate a pulley. The outer pulley blank is of the general type previously described fabricated from a ring-like blank in which the center portion has been removed. As will be noted, the blank 410 comprises a generally cylindrical wall 414 surrounded by an annular groove 416 from which extends substantially flat straight peripheral rim portion 418. It will be noted that the blank 410 differs from those previously described blanks not having a center in that a radially inwardly directed annular flange is not provided on the edge of the wall 414.

The inner pulley blank 412 comprises a central hollow cylindrical hub portion 420 which includes a first cylindrical wall portion 422, a radially inwardly directed wall portion 424, and a second cylindrical wall portion 426 of smaller diameter than the wall portion 422. A flat circular portion 428 closes the wall 426. A peripheral groove 430 surrounds the cylindrical portion 420 and flat peripheral rim wall 432 completes the blank configuration.

The blank 410 is nested on the blank 412 and this assembly is placed in the die set 434 illustrated in FIG. 27. The lower die half 436 of the die set has a central cylindrical recess 438 which slidingly receives a cylindrical block 440. The block 440 is urged outwardly by springs 442, 444. A cylindrical projection 446 of smaller diameter than the main diameter of the block is provided whereby the block configuration is such as to be receivable in the blank 412. This blank, with the blank 410 nested thereon, is placed on the cylindrical block 440 with the upper die half 448 in the raised position. A groove 450, having a curved configuration in cross-section, is provided in the working face of the half 436 surrounding the recess 438. A peripheral recess 452 for reception of the rim walls of the blanks surrounds the groove 450.

The upper die half 448 has an internal cavity 451 matching the configuration of the upper portion of the blank 412. This cavity is surrounded by a curved recess portion 454 which functions to half curl the clinching material during the clinching step.

An annular clamp member 456 surrounds the upper die shoe 448. The clamp member 456 is urged downwardly by means of springs 458 retained in a movable annular ring 460 which is lowered when the blanks have been placed into the die set to clamp the walls of the blanks and prevent radially outward movement thereof.

When the upper die half 448 is lowered, the material of the cylindrical wall portion 422 above the groove 430 is caused to form a half-curl by the groove 454 and extend into the groove 416 of the blank 410 and thereby clinch the blanks 410, 412 together. It will be noted that the resultant cinch 462 includes a generally S-shaped portion of the cylindrical wall 422 with the termination points or tails 464, 466 bent around portions of the S to result in a clinch which is interlocked eight different ways as previously described.

The clinched blank 468 is then formed into a final pulley 470 as previously described.

Figure 29:
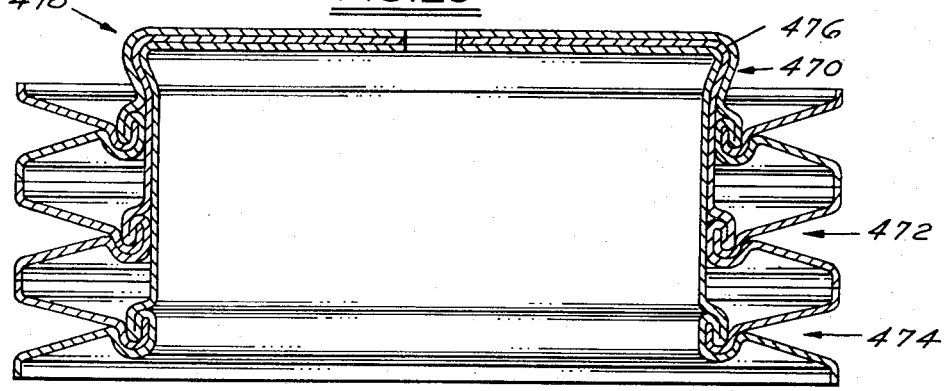
FIG. 29 is a sectional view of a finished multi-pulley formed from pulley sections fabricated in accordance with the method of FIGS. 25–28.
Figure 30:
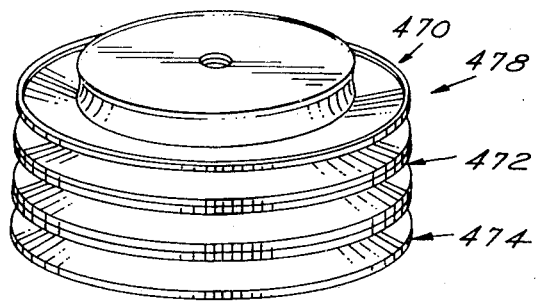
FIG. 30 is a view in perspective of the multi-pulley of FIG. 29.

FIGS. 29 and 30 illustrate use of three pulleys 470, 472, 474 formed in the manner described in connection with the FIGS. 25-28. These pulleys are clinched together at 476 in the manner previously described to result in a multi-pulley 478 capable of receiving three pulley belts.

The method described herein may be used in making or manufacturing any peripherally grooved sheet metal articles such as pulleys, wheels, rims, automobile wheel rims which receive rubber tires, pulley hubs, wheel structures, etc. The term "pulley" as used herein refers to any peripherally grooved sheet metal article or structure.

What I claim as my invention is:

1. The method of manufacturing a peripherally grooved sheet metal article comprising the steps of first die-forming and nesting together a pair of metallic discs to form an intermediate pre-clinched blank where at least one of the discs has a central hollow cylindrical portion closed at one end and both of which have nesting peripheral grooves surrounding the open end of said cylindrical portion with the remaining peripheral portions thereof defining an annular ring, then subjecting said intermediate pre-clinched blank assembly to the action of a die to cause deformation of the cylindrical wall, an outer peripheral portion of the closed end thereof and the material of the nesting peripheral grooves to form an annular clinched portion securing the metallic discs together to form an intermediate clinched blank assembly, then spreading the annular rims apart to define an annular groove.

2. The method as defined in claim 1, and further characterized in that during the clinching step the material of the nesting peripheral grooves is held substantially stationary while the cylindrical walls and outer peripheral portion of the closed end is folded radially outwardly thereover to form a clinched portion of mutually intertwining generally S-shaped, in cross-section, sections of each disc with end portions of the S-shaped sections being folded back upon the S-shape.

3. The method of manufacturing a peripherally grooved sheet metal article as defined in claim 1, and further characterized in that said annular rims are formed as substantially flat portions closely spaced together in the intermediate clinched blank assembly stage, said rims being spread apart by the steps of clamping the intermediate clinched blank assembly with the rims exposed, providing a roller having a peripheral V-shaped projection thereon, placing the apex of said V-shaped projection in pressure engagement between the outer edges of the rims, and relatively rotating the intermediate clinched blank assembly and roller around the periphery of the intermediate clinched blank assembly while advancing the roller radially inwardly thereof to cause the rims to spread in a V-shape conforming to the shape of the projection.

4. The method of manufacturing a peripherally grooved sheet metal article as defined in claim 3, and further characterized in that during the steps of forming the intermediate pre-clinched blank and intermediate clinched blank assembly, die relief is provided in the area of the outer periphery of said rims whereupon said rims initially spread apart a distance sufficient to permit ready insertion of said projection therebetween.

5. The method of manufacturing a peripherally grooved sheet metal article as defined in claim 3, and further characterized in the provision of cylindrical portions on the roller adjacent said projection, providing a pair of spaced apart annular flanges having flat surfaces above and below and radially inwardly of the rims of the clamped intermediate clinched blank assembly, and advancing the roller radially inwardly sufficiently to cause deformation of the outer marginal edges of the rims against the flanges to form rim flanges on the resultant article.

6. The method of manufacturing a peripherally grooved sheet metal article as defined in claim 5, and further characterized in the provision of a pair of rim flange shaving tools, one being positioned above and the other below the rim flanges and having a cutting edge in alignment therewith, and advancing said tools into engagement with the rim flanges simultaneously with the formation thereof to shave off excess material there-from and balance the resultant article.

7. The method of manufacturing a peripherally multi-grooved sheet metal article structure comprising the steps of fabricating a plurality of separate articles, each article being fabricated by die-forming a pair of metallic discs into a grooved article having a pair of peripheral rim portions, a central hub portion formed of the material of at least one of the discs, and an annular clinched portion between the rim portions and hub portion formed of material of both discs folded over upon each other, the central hub portion defining a central hollow cylindrical portion closed at one end and formed with a first cylindrical wall, a second radially inwardly directed wall, a third cylindrical wall of smaller diameter than the first cylindrical wall, a fourth radially inwardly directed wall, a fifth cylindrical wall of smaller diameter than the third cylindrical wall, and the closed end, the third cylindrical wall of each successive article being formed of greater length by a distance equal to the divergence of the rims, the third and fifth cylindrical walls of each successive article being formed of smaller diameter by the wall thickness than the preceding article to facilitate nesting of the articles together, then nesting the articles together and then forcing a cylindrical element of slightly less diameter than the last third cylindrical wall into the open end of the assembly against the innermost fourth wall with sufficient pressure to cause all of the fourth and fifth walls to deform radially outwardly and form a peripheral bulge clinching the articles together.

8. The method of manufacturing a peripherally multigrooved sheet metal article structure as defined in claim 7, and further characterized in that each separate article is formed by the steps of first die-forming and nesting together a pair of metallic discs to form an intermediate pre-clinched blank where at least one of the discs is formed with the described central hollow cylindrical portion and both of which have nesting peripheral grooves surrounding the open end of cylindrical portion with the remaining peripheral portions thereof defining the annular portions, then subjecting intermediate pre-clinched blank assembly to the action of a die to cause deformation of the first cylindrical wall, the second radial wall, and the material of the nesting peripheral grooves while maintaining the third cylindrical wall, fourth radial wall, fifth cylindrical wall and closed end in the undeformed state to thereby form an annular clinched portion securing the metallic discs together to form an intermediate clinched blank assembly, then spreading the annular rim portions apart to define an annular groove.

9. The method of manufacturing a peripherally grooved sheet metal article comprising the steps of first die-forming and nesting together a pair of metallic discs to form an intermediate pre-clinched blank where at least one of the discs is formed with a central portion and both of which have nesting peripheral double grooves surrounding said central portion with the remaining peripheral portion thereof defining annular rims, then subjecting the intermediate pre-clinched blank assembly to the action of a die to cause deformation of the material of the nesting peripheral double grooves to form an annular clinched portion comprising two concentric annular clinched rings securing the metallic discs together to form an intermediate clinched blank assembly, then spreading the annular rims apart to define an annular groove.

10. The method of manufacturing a peripherally grooved sheet metal article as defined in claim 9, and further characterized in that said double groove is formed with inner and outer annular cylindrical walls connected by a wall dished towards the opening of the groove whereby the inner cylindrical wall and one-half of the dished connecting wall define one groove and the outer cylindrical wall and the other half of the dished connecting wall define the other groove, then deforming said double grooves to form the pair of annular concentric clinched portions by folding the halves of the double grooves in opposite directions to form mutually intertwining generally S-shaped, in cross-section, clinches, end portions of the S-shaped sections being folded back upon the S-shape.

11. The method of manufacturing a peripherally grooved sheet metal article as defined in claim 9, and further characterized in that said double groove is formed as a sidewardly extending generally S-shaped configuration with one-half of the S lying above a plane extending at right angles to the axial center of the blank and the other half of the S lying below said plane, then deforming said double grooves to form the pair of annular concentric clinched portions by simultaneously folding the halves of the S-shape in opposite directions to form mutually intertwining generally S-shaped, in cross-section, clinches, and portions of the S-shaped sections being folded back upon the S-shape.

12. The method of manufacturing a peripherally grooved sheet metal article comprising the steps of first die-forming and nesting together a pair of metallic discs to form an intermediate pre-clinched blank where one of the discs is formed with a central portion surrounded by an annular groove with the remaining peripheral portion defining an annular rim and the other of the discs is a ring-like member formed with a central hook-shaped section which is nested in the groove of the other disc with the remaining peripheral portion thereof defining an annular rim, then subjecting the intermediate pre-clinched assembly to the action of a die to cause deformation of the material of the nesting groove and hook-shaped section to form an annular clinched portion comprising, in cross-section, a hook-shaped inner peripheral section on said ring-like disc and a generally S-shaped section on said other disc completely surrounding said hook-shaped section, then spreading the annular rims apart to define an annular groove.

13. The method as defined in claim 12, and further characterized in the step of folding the end portions of the S-shaped sections and one end portion of the hook-shaped section back upon the S-shape.

* * * * *

UNITED STATES PATENT OFFICE
CERTIFICATE OF CORRECTION

Patent No. 3,719,980          Dated   March 13, 1973

Inventor(s)   PETER J. VAN BUSSEL

It is certified that error appears in the above-identified patent and that said Letters Patent are hereby corrected as shown below:

Column 1, line 37, "along" should read -- alone -- . Column 7, line 60, "196" should read -- 176 -- . Column 9, line 2, "multinpulley" should read -- multi-pulley -- ; line 14, after "face", insert -- portion.

Signed and sealed this 22nd day of January 1974.

(SEAL)
Attest:

EDWARD M. FLETCHER, JR.          RENE D. TEGTMEYER
Attesting Officer                Acting Commissioner of Patents